M. H. MADSEN.
DEVICE FOR TEACHING YOUNG ANIMALS TO DRINK.
APPLICATION FILED OCT. 14, 1912.

1,065,459.

Patented June 24, 1913.

WITNESSES:
L. C. Paley
A. G. Hague

INVENTOR.
Mads H. Madsen.
BY
Orwig & Baur
ATTORNEYS

UNITED STATES PATENT OFFICE.

MADS H. MADSEN, OF KIMBALLTON, IOWA.

DEVICE FOR TEACHING YOUNG ANIMALS TO DRINK.

1,065,459. Specification of Letters Patent. Patented June 24, 1913.

Application filed October 14, 1912. Serial No. 725,755.

*To all whom it may concern:*

Be it known that I, MADS H. MADSEN, a citizen of the United States, residing at Kimballton, in the county of Audubon and State of Iowa, have invented a certain new and useful Device for Teaching Young Animals to Drink, of which the following is a specification.

The object of my invention is to provide a device for teaching young animals to drink of simple, durable and inexpensive construction.

A further object is to provide such a device made of somewhat resilient material and designed to be fitted over the upper jaw and nose of a calf or the like and so constructed and arranged that when the animal sucks on the device, milk or other liquid food will be readily drawn into the mouth.

My invention consists in certain details, in the construction, arrangement and combination of the various parts of the device, whereby the objects contemplated are attained, as hereinafter set forth, pointed out in my claims and illustrated in the accompanying drawings, in which—

Figure 1:
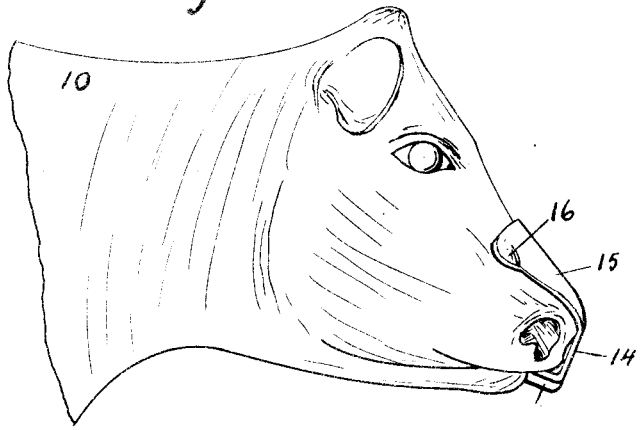
Figure 3:
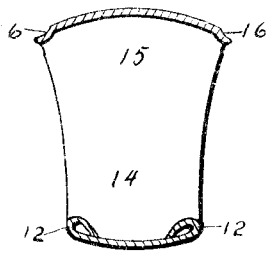
Figure 2:
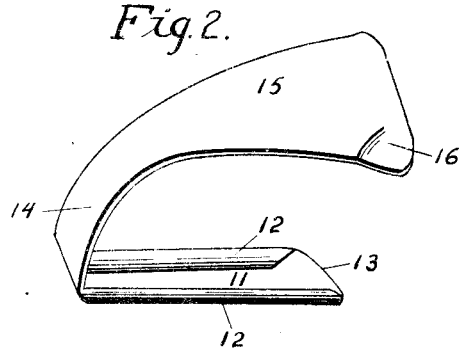

Figure 1 shows a side elevation of a calf's head with my improved device for teaching young animals to drink installed on the calf's upper jaw and nose. Fig. 2 shows a perspective view of my improved device. Fig. 3 shows a vertical, transverse, sectional view of the same.

In the accompanying drawings I have used the reference numeral 10 to indicate the head of a calf which is shown for the purpose of illustrating the manner in which my device for teaching young animals to drink is used.

The device consists of a bottom plate 11 which is approximately flat with rounded corners and has its side edges rolled over forming a bead or rib 12 thereby producing a grooved structure as clearly shown in Fig. 2. The plate 11 is designed to fit in the roof of the animal's mouth with the beads 12 resting against the roof of the mouth. Formed on one end of the plate 11 is an upwardly curved portion 14 designed to receive the upper lip of the animal and having at its upper end an upwardly and rearwardly extending portion 15. The free end of the portion 15 is curved as shown in Figs. 1 and 2 to fit over the nose of the animal and is considerably wider than the portion 14. In the corners of the free end of the portion 15 are depressions 16 designed to fit into the depressions behind the nostrils of the animal.

It will be understood that my improved device is made of somewhat resilient material such as hard rubber or metal and the distance between the free end of the portion 15 and the bead 12 is normally somewhat shorter than the distance from the roof of the mouth to the ridge of the nose so that it is necessary to spring the portion 15 slightly away from the portion 11 in order to place the device in position on the nose of the animal.

The device is so constructed and proportioned that when the plate 11 is received in the mouth with the beads 12 resting against the roof of the mouth and the portion 15 placed over the nose, the device will firmly grip the nose of the animal. The portions 14 and 15 are curved upwardly and rearwardly in such a way that when the device is installed in position the forward part of the portion 15 and the upper part of the portion 12 are in engagement with the nose of the animal while the lower part of the portion 14 and the forward part of the plate 11 will extend forwardly from the nose of the animal and be free from engagement with the upper lip as clearly shown in Fig. 1.

The advantages of my improved device are obvious. It is often very difficult to teach young animals such as calves, to drink from a pail or the like. With my improved device the calf or animals sucks the milk or other liquid through the space between the forward portion thereof and the calf's upper lip, and through the groove between the ribs 12.

My device is of simple and inexpensive construction, can be readily and thoroughly cleaned and is practically everlasting. It can be made of various materials and with a number of variations in the details of its construction without departing from the essential features of my invention as defined in the appended claims.

I claim as my invention.

1. In a device of the class described comprising a flat plate having ribs at its edges, thereby forming a groove, designed to rest against the roof of the mouth of the animal, a portion curved upwardly and a portion curved rearwardly and upwardly from said first portion and designed to fit the ridge of the nose of the animal.

2. In a device of the class described comprising a flat plate with raised edges designed to rest against the roof of the mouth of the animal, a portion curved upwardly and a portion curved rearwardly and upwardly from said first portion and designed to fit the ridge of the nose of the animal, said device being so constructed that the lower forward portion thereof extends forwardly leaving a space between the same and the upper lip of the animal.

3. In a device of the class described comprising a plate with its edges rolled at its sides to form a grooved structure designed to rest against the roof of the mouth of the animal, a portion curved upwardly and a portion curved rearwardly and upwardly from said first portion and designed to fit the ridge of the nose of the animal, said last named portion being provided with depressions on each side of its upper end.

Des Moines, Iowa, September 21, 1912.

MADS H. MADSEN.

Witnesses:
HARALD HARKSON,
HANS MADSEN.